United States Patent [19]

Kosowski et al.

[11] Patent Number: 5,914,003
[45] Date of Patent: Jun. 22, 1999

[54] CELLULOSE OXIDATION

[75] Inventors: Brian M. Kosowski, Norristown; Bernard M. Kosowski, King of Prussia, both of Pa.

[73] Assignee: Mach I, Inc., King of Prussia, Pa.

[21] Appl. No.: 09/094,318

[22] Filed: Jun. 9, 1998

[51] Int. Cl.⁶ .............................. D21C 3/16; D21C 9/00
[52] U.S. Cl. .............................. 162/81; 162/72; 162/74; 162/9; 8/116.1; 8/107
[58] Field of Search .................... 8/116.1, 107; 536/124, 536/56; 162/72, 81, 74, 9

[56] References Cited

U.S. PATENT DOCUMENTS 3,364,200  1/1968  Ashton et al. .
4,347,057  8/1982  Yasnitsky et al. .
5,180,398  1/1993  Boardman et al. ..................... 8/181

OTHER PUBLICATIONS

Hayes, Michael Specialty Fluids Technical Paper Abstract, 3M General Industrial Market web site, Oct. 1995.

Product Information, 3M, 3M General Industrial Market web site, pp. 1–8, www.mmm.com/market/industrial/fluids/7100.html, Oct. 1997.

*Primary Examiner*—Peter Chin
*Assistant Examiner*—Kevin Cronin
*Attorney, Agent, or Firm*—William C. Long

[57] ABSTRACT

Cellulose is effectively oxidized with nitrogen dioxide in a hydrofluoroether solvent.

11 Claims, No Drawings

CELLULOSE OXIDATION

BACKGROUND OF THE INVENTION

1. Field of the Invention

The present invention relates to a process for oxidizing cellulose with a solution of nitrogen dioxide in one or more hydrofluoroether solvents.

2. Description of the Related Art

The oxidation of cellulose by reaction of cellulose with nitrogen dioxide is a well known process. A patent which provides a comprehensive description of the development of this technology is U.S. Pat. No. 5,180,398, the subject matter of which is incorporated herein by reference. The improvement of U.S. Pat. No. 5,180,398 is asserted to reside in the use of a particular class of solvents, notably perfluorocarbon solvents, in carrying out the otherwise known reaction. The use of perfluorocarbon solvents is said to be an improvement over the use of various closely analogous solvents including chlorinated hydrocarbons and chlorinated fluorocarbons as disclosed in U.S. Pat. Nos. 3,364,200 and 4,347,057. Ethers are said to be ineffective as solvents for the cellulose oxidation.

BRIEF DESCRIPTION OF THE INVENTION

It has now been found that hydrofluoroethers are effective nitrogen dioxide solvents for the oxidation of cellulose. Specifically, in accordance with the invention, cellulose is oxidized by contact at oxidizing conditions with a solution comprised of nitrogen dioxide in hydrofluoroether solvent.

DETAILED DESCRIPTION

The essence of the invention resides in the use of a novel class of solvents, hydrofluoroethers, in an otherwise known cellulose oxidation procedure. Except for the use of the novel solvents, the process of the invention is substantially the same as that described in considerable detail in U.S. Pat. Nos. 3,364,200 and 5,180,398, the disclosures of which are incorporated herein by reference.

The hydrofluoroether solvents which are employed herein have the formula $C_n F_{2n+1} OR$ wherein n is a whole number from 1–10 and R is $C_1$–$C_5$ alkyl radical. Especially preferred is 1-methoxy-nonafluorobutane which is available from 3M as 3M™ HFE-7100.

In view of the teaching in U.S. Pat. No. 5,180,398 requiring that solvents containing no hydrogen or chlorine are used, and that ethers are ineffective solvents, it is indeed surprising that practice of the present invention provides an effective process for the oxidation of cellulose.

As described in the art, 100% oxidation of cellulose corresponds to 25.5% carboxylic acid content. In practice, the degree of oxidation depends on the application which is intended for the material. For medical applications, the material should be bioabsorbable, which requires at least about 10% carboxylic acid content, at which point oxidation is about 40% complete. For sutures, a low oxidation level may be desirable, causing bioabsorption to take place slowly over a period of weeks, during which the sutures are functional. If the material is used for hemostasis, rapid absorption is desirable, with 18%–21% carboxyl content preferred.

As described in the prior art, including U.S. Pat. No. 5,180,398, achieving the desired oxidation involves an interplay among the nitrogen dioxide concentration in the solvent and the temperature and duration of the reaction. If the nitrogen dioxide concentration is too low, oxidation is slow and desirable oxidation levels may require times in excess of a day. If the concentration is too high, the reaction generates a lot of heat and becomes hard to control. Further more, the nitrogen dioxide may damage the material. A range of nitrogen dioxide concentration of 2–12% by weight is generally preferred, with 5–10% more preferred. Generally, the preferred nitrogen dioxide concentration yields a cellulose: nitrogen dioxide ratio of about 1.

The reaction may be run at atmospheric pressure, but preferably the reaction is run in a closed vessel, with pressure rising as a result of the heat and vapors generated during the reaction.

Running the oxidation reaction at higher temperatures permits faster operation, but the quality of the resultant material suffers (i.e., it becomes stiff and less soft) if temperatures are too high, particularly if the nitrogen dioxide concentration is high, also. The oxidation is preferably run at temperatures between ambient (–25° C.) and 60° C., with the range between 35° and 50° C. more preferred.

In order to achieve the desired level of oxidation with the preferred nitrogen dioxide concentration and temperature, reaction times are at least about 7 hours.

The present invention is further described in the following examples.

EXAMPLE 1

Oxidation of Cotton Pellets in hydrofluoroethers

About 21,318 grams of 1-methoxy-nonafluorobutane were chilled and then added to a 72 liter round bottom reaction vessel. The vessel was then immersed in an ice bath. The vessel was purged with argon to remove air and 2,386 grams of $N_2O_4$ was then added to the reaction vessel and chilled for 30 minutes. About 1,590 grams of cotton pellets were then added. The weight ratio of solvent: pellets: $N_2O_4$ was 13.4:1:1.5. The reaction mixture was stirred and allowed to slowly rise to temperature (28° C.). A warm water bath could be used to raise the temperature to 28–38° C. if necessary. At the point at which the positive pressure was great enough to displace the stopper on the reaction vessel, a condenser and caustic trap was set up to neutralize the exit gases.

The reactor was cooled in a water bath and vented into the caustic trap directly to neutralize exit gases. The mixture of solvent and remaining $N_2O_4$ was then pumped out of the reaction vessel and stored for recycling. The time of reaction was about 16 hours. The cotton pellets were removed and placed in a large Butner funnel for washing. Due to the batch size, the cotton was washed in two separate batches. The first wash consisted of 3 one liter volumes of chilled distilled water. This was followed by 9 two liter volumes of distilled water. The wash water had a pH of 4.5. Next the cotton was washed with 2 two liter volumes of a 50:50 water/isopropyl alcohol. The final wash consisted of 2 two liter volumes of 100% isopropyl alcohol. The wash mix had a pH of 4.9. This procedure was repeated for the second part of the batch. The material was then filtered under vacuum and placed on a forced air bed for drying. One gram of cotton pellets was dried for 2 hours at 90° C. The dried pellets were then dissolved in 10 ml of 0.5N sodium hydroxide solution and diluted with 100 ml of distilled water. The solution was then titrated to a phenolphthalein end point. A blank was also run using only the sodium hydroxide solution, with no cotton added. The carboxylic acid content of the cotton, calculated from the back titration of the sodium hydroxide solution, was 17.4%.

EXAMPLE 2

Oxidation of Cotton Pellets in 1-methoxy-nonafluorobutane 5773 grams of 1-methoxy-nonfluorobutane were chilled and then added to a 12 liter round bottom reaction vessel. the vessel was immersed in an ice bath and purged with argon to remove air. 818 grams of $N_2O_4$ was then added to the reaction vessel and chilled for 30 minutes. 454 grams of cotton pellets were then added. The ratio of solvent: pellets: $N_2O_4$ was 12.7:1:1.8. The reaction mixture was stirred and allowed to slowly rise to temperature (28° C.). A warm water bath could be used to raise the temperature to 28–38° C. if necessary. At the point at which the positive pressure was great enough to displace the stopper on the reaction vessel, a condenser and caustic trap was set up to neutralize the exit gases.

The reactor was cooled in a water bath and vented into the caustic trap directly to neutralize exit gases. The mixture of solvent and remaining $N_2O_4$ was then pumped out of the reaction vessel and stored for recycling. Total time of reaction was about 16 hours. The cotton pellets were removed and placed in a large Butner funnel for washing. The first wash consisted of 3 one liter volumes of chilled distilled water. This was followed by 7 two liter volumes of distilled water. The wash water had a pH of 4.2. Next the cotton was washed with 2 two liter volumes of a 50:50 water/isopropyl alcohol mix. The final was consisted of 2 one liter volumes of 100% isopropyl alcohol. The wash mix had a pH of 4.3. The material was then filtered under vacuum and placed on a forced air bed for drying. One gram of cotton pellets was dried for 2 hours at 90° C. The dried pellets were then dissolved in 10 ml of 0.5N sodium hydroxide solution and diluted with 100 ml of distilled water. The solution was then titrated to a phenolphthalein end point. A blank was also run using only the sodium hydroxide solution, with no cotton added. The carboxylic acid content of the cotton, calculated from the back titration of the sodium hydroxide solution, was 17.2%.

The examples illustrative the effective oxidation of cellulose with nitrogen dioxide using a hydrofluoroether solvent.

I claim:

1. A process for oxidizing cellulose comprising the step of reacting the cellulose with nitrogen dioxide in solution in a hydrofluoroether solvent to oxidize said cellulose where the hydrofluoroether solvent has the formula $C_n F_{(2n+1)}$ OR wherein n is a whole number from 1–10 and R is $C_1$–$C_5$ alkyl radical.

2. The process of claim 1 in which the solvent has a boiling point in the range between about 30° C. and about 100° C.

3. The process of claim 2 in which the solvent has a boiling point in the range between about 45° C. and about 85° C.

4. The process of claim 1 in which the solvent has the formula $C_n F_{2n+1}$ OR, wherein n is a whole number from 1–10 and R is a $C_1$–$C_5$ alkyl radical.

5. The process of claim 1 in which the nitrogen dioxide concentration in the solution is in the range between about 2% and about 12% by weight.

6. The process of claim 5 in which the nitrogen dioxide concentration in the solution is about 5–10%.

7. The process of claim 1 in which the reactants are maintained at a temperature in the range between about 25° C. and about 60° C. during the reaction.

8. The process of claim 7 in which the reactants are maintained at a temperature in the range between about 35° C. and about 50° C. during the reaction.

9. The process of claim 1 in which the reaction is continued for at least about 7 hours.

10. The process of claim 1 in which the reaction is continued until oxidation is at least about 40% complete.

11. The process of claim 1 wherein the solvent is 1-methoxy nonafluoroether.

* * * * *